United States Patent
Veni et al.

(10) Patent No.: US 9,110,597 B2
(45) Date of Patent: Aug. 18, 2015

(54) DATA PROCESSING METHOD AND SYSTEM

(75) Inventors: Sakshi Chaitanya Veni, Bangalore (IN);
Satish Kumar Mopur, Bangalore (IN);
Parthasarathi Ilangovan, Bangalore (IN); Prasanna Muthukumarasamy, Bangalore (IN); Srivatsa Ramaprakash, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1693 days.

(21) Appl. No.: 12/197,827

(22) Filed: Aug. 25, 2008

(65) Prior Publication Data

US 2009/0150577 A1    Jun. 11, 2009

Related U.S. Application Data

(60) Provisional application No. 60/996,882, filed on Dec. 10, 2007.

(51) Int. Cl.
*G06F 13/18* (2006.01)
*G06F 3/06* (2006.01)
*G06F 12/08* (2006.01)

(52) U.S. Cl.
CPC .............. *G06F 3/0635* (2013.01); *G06F 3/067* (2013.01); *G06F 3/0613* (2013.01); *G06F 12/0862* (2013.01); *G06F 12/0866* (2013.01); *G06F 2206/1012* (2013.01)

(58) Field of Classification Search
CPC ..... G06F 3/0635; G06F 3/0613; G06F 3/067; G06F 12/0862; G06F 12/0866; G06F 2206/1012

USPC .......................................................... 710/38
See application file for complete search history.

(56) References Cited

U.S. PATENT DOCUMENTS

| | | | |
|---|---|---|---|
| 6,434,637 B1 * | 8/2002 | D'Errico .......................... | 710/38 |
| 6,704,812 B2 | 3/2004 | Bakke et al. | |
| 6,738,839 B2 | 5/2004 | Sinha | |
| 6,792,482 B2 | 9/2004 | Iwatani et al. | |
| 7,032,041 B2 * | 4/2006 | Sahara et al. .................... | 710/38 |
| 7,080,146 B2 | 7/2006 | Bradford et al. | |

(Continued)

FOREIGN PATENT DOCUMENTS

| | | |
|---|---|---|
| JP | 07-191930 | 7/1995 |
| JP | 2002-533831 | 10/2002 |

(Continued)

OTHER PUBLICATIONS

EMC Corporation, Datasheet, EMC PowerPath—The Enabler for EMC Host-Based Solutions, Jun. 2010 (5 pages).

(Continued)

*Primary Examiner* — Henry Tsai
*Assistant Examiner* — John Roche
(74) *Attorney, Agent, or Firm* — Hewlett-Packard Patent Department

(57) ABSTRACT

A method of retrieving data blocks in a storage area network, the method comprising selecting a first one of a plurality of paths to a storage device; retrieving a first number of sequential data blocks from the storage device along the first path; and selecting a second one of the plurality of paths for retrieving subsequent sequential data blocks from the storage device. One or both of the selected paths may be the path with the lowest average turnaround time of all of the available paths.

11 Claims, 4 Drawing Sheets

(56) References Cited

U.S. PATENT DOCUMENTS

| | | |
|---|---|---|
| 7,120,912 B2 | 10/2006 | Kadoiri et al. |
| 7,127,545 B1 | 10/2006 | Nandi |
| 2002/0087722 A1* | 7/2002 | Datta et al. ............... 709/239 |
| 2004/0228166 A1* | 11/2004 | Braun et al. ............... 365/154 |

FOREIGN PATENT DOCUMENTS

| | | |
|---|---|---|
| JP | 2005-010956 | 1/2005 |
| JP | 2005-149276 | 6/2005 |

OTHER PUBLICATIONS

EMC Corporation, White Paper, EMC Performance Optimization for VMware Enabled by EMC PowerPath VE, Sep. 2009 (40 pages).

EMC Corporation, White Paper, EMC PowerPath/VE for VMware vSphere, May 2009 (20 pages).

EMC Corporation, White Paper, EMC CLARiiON CX3 Best Practices for Achieving "Five 9s" Availability, Feb. 2007 (14 pages).

* cited by examiner

DATA PROCESSING METHOD AND SYSTEM

CROSS-REFERENCE TO RELATED APPLICATIONS

This Utility Patent Application is based on and claims the benefit of U.S. Provisional Application No. 60/996,882, filed on Dec. 10, 2007, the contents of which are hereby incorporated by reference in their entirety.

BACKGROUND TO THE INVENTION

In enterprise SAN (Storage Area Network) environments, sequential I/O (input/output) is frequently implemented by certain applications. Sequential I/O is typical of large file reads and writes, and typically involves operating on one block immediately after its neighbour. With this type of I/O, there is little penalty associated with the disk drive head having to move to a new location.

An application (for example) running on the data processing system may wish to read from a file stored on the storage device. Typically, data is stored on the storage device in blocks, and the file may reside in one or more blocks. When a data query is made by the application in a data processing system to the storage device, the appropriate blocks are retrieved from the physical disks and stored in the cache of the storage device. From here, the blocks are passed on to the applications as IO buffers (or packets) via the physical media (for example, Fibre channel physical media).

In a storage area network, there may be multiple paths through the switched fabric from the data processing system to the storage device.

The storage device may have number of logical units (LUNs). A LUN, or Logical Unit Number (also referred to as Logical Unit i.e., LU), corresponds to an actual or virtual portion of a storage element. For example, a LUN may correspond to one or more disks in a disk drive array.

The storage device may include a cache to store recently accessed data. The storage device may also employ data prefetching. With data prefetching, the storage device fetches more data from the LUN than requested and stores them in the cache. When sequential requests (specifically reads) are detected, data blocks that are further along the sequence but have not yet been requested are copied from LUN into the cache. When the storage device receives requests for these prefetched data blocks, these blocks are provided more quickly to the requesting data processing system as access to cache is typically faster than access to physical storage.

The caching policies employed by different storage arrays are not the same. For example, some arrays employ caching for I/O passing through a port, caching for I/O passing through a controller or caching for I/O to/from any specific component (e.g. a LUN) in an array.

Under the above conditions, routing the 10 to components sharing the same cache may lead to cache invalidation, thus not effectively using data pre-fetching feature.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

For effective pre-fetching, sequential requests should arrive at a storage component (such as, for example, a LUN) on a storage device sharing the same cache as other storage components in the storage device. However, if sequential block requests span multiple components, not sharing, the cache between the components would result in cache invalidation, thus leading to the ineffective use of a storage array's pre-fetch feature. Furthermore, this would adversely affect the performance of the array, as the array would have to invalidate the cache and pre-fetch using a new component's cache. Also, retrieving all of the blocks over a single path from the storage device in order to utilize the pre-fetch feature effectively, may lead to congestion of that path in the storage area network (SAN) and/or inefficient use of all of the paths in the SAN.

Embodiments of the invention at least mitigate one or more of the problems of the prior art by servicing, a first plurality of sequential data block requests over a single path and then moving on to the next path to service another plurality of sequential data block requests, and then moving on to another path, and so on. This way, groups of sequential requests for data blocks (that is, requests for sequential data blocks) arrive at the storage device and are detected as sequential requests by the storage device. Thus, the prefetching feature of the storage device is used. Further, path congestion is avoided as not all requests corresponding to a single data buffer are serviced using a single path in the SAN. Instead, multiple paths are used, and therefore the multiple paths of the SAN are used more efficiently than using a single path and/or congestion is alleviated or avoided.

Figure 1:
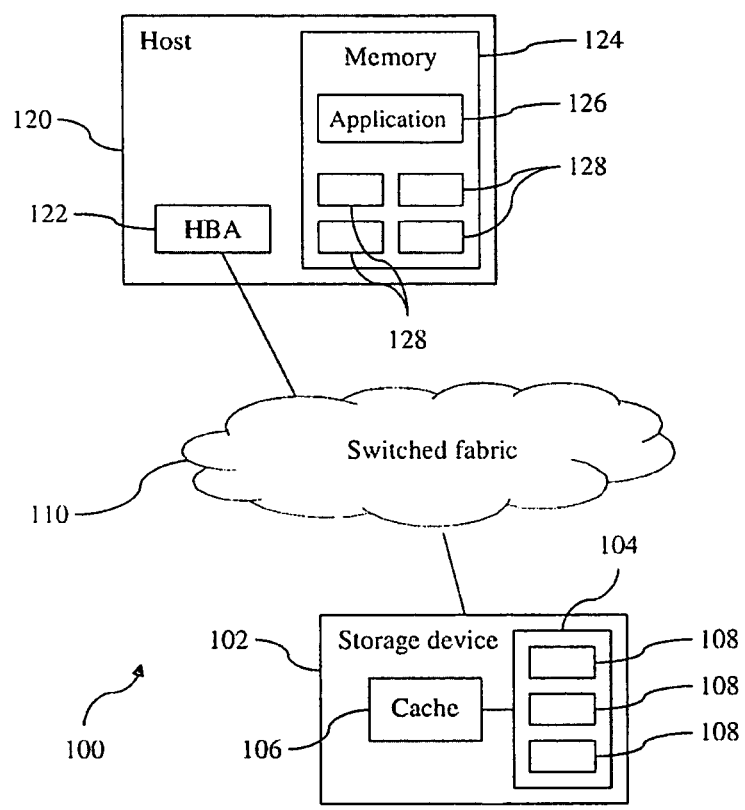
FIG. 1 shows an example of a storage area network.

FIG. 1 shows an example of a storage area network 100. The SAN 100 includes a storage device 102. The SAN 100 may also include other storage devices (not shown). The storage device 102 includes physical storage 104 and a cache 106. Data stored in the physical storage 104 is arranged in a plurality of fixed-size blocks 108. There may be any number of blocks 108, depending on the size of the physical storage 104 and the size of the blocks 108.

The physical storage 104 may comprise a single physical storage device, or multiple physical storage devices. Examples of physical storage devices include hard disks, optical storage devices, tape storage devices and the like. Examples of physical storage 104 containing multiple physical storage devices include RAID (Redundant Array of Independent Drives) arrays, JBOD and the like.

A LUN or Logical Unit Number (also referred to as Logical Unit, LU) corresponds to an actual or virtual portion of a physical storage devices. For example, a LUN may correspond to one physical disk, or multiple physical disks in a disk drive array. Typically, LUNs in the storage device 102 in the SAN appear as unique storage elements for applications to store and/or access data.

The SAN also includes a switched fabric 110. The switched fabric contains networking components, for example one or more network switches and routers and interconnections between them. The switched fabric 110 may include multiple networking components and interconnections to provide redundancy to attempt to avoid the effects of one or more networking components failing to operate correctly. For example, where a networking component fails such that a path to a storage device is unavailable, another path to the storage device may be available through one or more other networking components. Networking components in a SAN typically comprise Fibre Channel (FC) devices such as Fibre Channel switches, although additionally or alternatively any other suitable networking technologies may be used (for example Ethernet).

A data processing system 120 (also known as a host) may be connected to the switched fabric 110 of the SAN 100. The host 120 includes a device 122 to enable the host 120 to connect to the switched fabric 110. The device 122 may comprise, for example, one or more Host Bus Adapters (HBAs) for connecting to a Fibre Channel network, or any other suitable device or devices for connecting to the switched fabric 110.

The host 120 includes memory 124 (such as RAM). An application 126 executing on the host 120 may reside in the memory 124. The memory 124 may also contain one or more I/O buffers 128 for storing data blocks used by the application 126 and/or other applications (not shown).

When the application opens a file for reading and/or writing, the data blocks containing the file must be moved to the memory 124 so that the application can access the data in the data blocks corresponding to the file. An I/O buffer is created in the memory 124 that indicates, for example, the storage device (LUN) on which the file is stored, the starting block number (i.e. the first data block in which the file is stored in the LUN) and the number of blocks (i.e. the number of sequential blocks in which the file is stored). Therefore, the indicated number of sequential blocks must be copied from the storage device 102 to the I/O buffer in the memory 120.

Sequential I/O may be used to create multiple I/O buffers, each for containing one or more data blocks, the multiple I/O buffers collectively corresponding to all of the data blocks containing the file requested by the application 126. In alternative embodiments of the invention, a request by the application 126 to read from and/or write to the file may create such multiple I/O buffers instead of a single I/O buffer. In further alternative embodiments of the invention, only one I/O buffer is created. In any case, groups of sequential data blocks are retrieved from the storage device 102 along respective paths through the switched fabric 110 such that the storage device 102 detects retrieval of sequential data blocks. The groups themselves however, even though they are sequential, may or may not be retrieved sequentially (in order) from the storage device 102.

Figure 2:
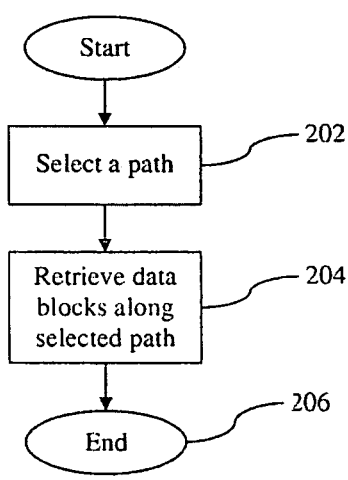
FIG. 2 shows an example of a method of retrieving data blocks according to embodiments of the invention.

FIG. 2 shows a method 200 of retrieving data blocks according to embodiments of the invention. The data blocks are retrieved by the host 120 for storage in one or more I/O buffers 128 in memory 124 for use by the application 126. The method starts at step 202 where a path through the switched fabric 110 from the host 120 to the storage device 102 is selected for retrieval of a certain number of data blocks. The method 200 then proceeds to step 204 where a certain number of sequential data blocks are retrieved in-order (for example, in order of ascending or descending block number) from the storage device 102 along the selected path and stored in one or more I/O buffers 128. The method then ends at step 206.

In embodiments of the invention where multiple I/O buffers are created for retrieval and storage of data blocks containing, for example, a file requested by the application 126, the method 200 may be executed for each I/O buffer, for example in parallel and/or sequentially and/or in any order. In step 204 of the method 200, for example, all of the data blocks to be retrieved and stored in an I/O buffer are retrieved and stored in that I/O buffer.

Figure 3:
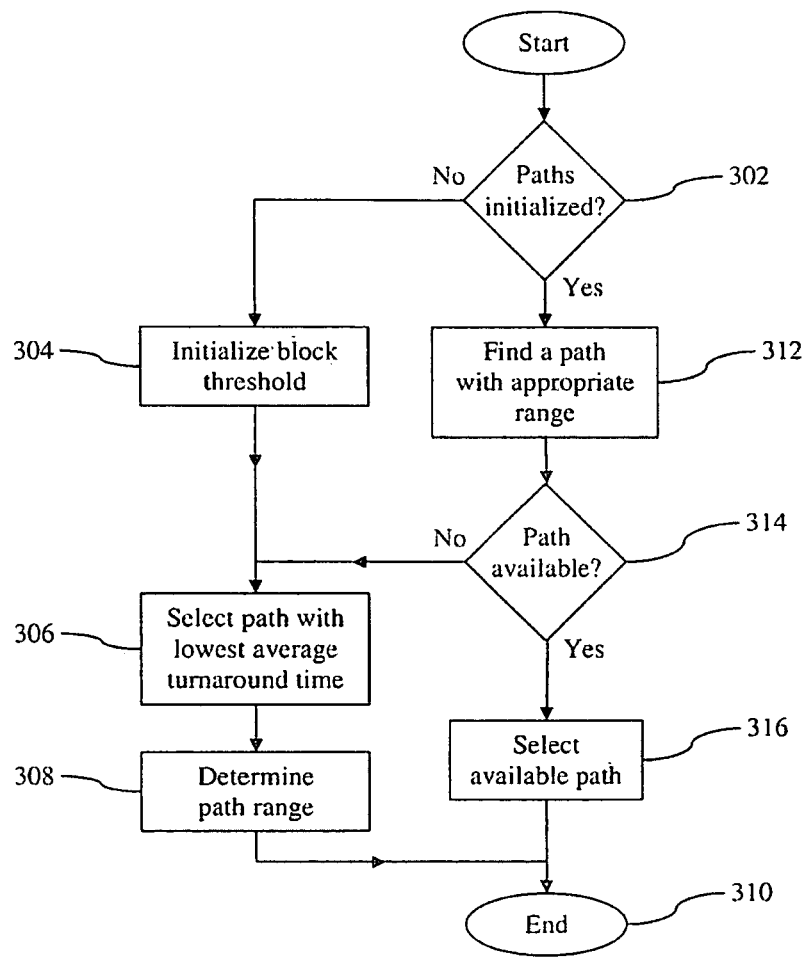
FIG. 3 shows an example of selecting a path.

FIG. 3 shows an example of a method 300 for selecting a path (corresponding to step 202 of the method 200 shown in FIG. 2) for an I/O operation to be performed within the SAN. The method 300 starts at step 302 where it is determined whether paths have been initialized. If not then the method proceeds to step 304 where the "block threshold" value is initialized. This value can be initialized to a preconfigured value, such as a fixed value or a value that has been specified by a user (for example, a system administrator). Next, in step 306, a path is selected. An example of selecting a path, as shown in FIG. 3, comprises selecting a path with a lowest average turnaround time, as follows. Embodiments of the invention maintain a record of the average turnaround time for each path. Multipathing software running on the host 120 may periodically poll a path to check its connectivity status, i.e. send a communication to an end point of the path, such as a storage device, to instruct it to respond, thus checking the path's connectivity status. A first value may be maintained per path which is the average poll turnaround time between a path poll and a received response. A record may also be maintained for an average controller turnaround time for paths leading to a controller (where the controller controls multiple storage devices/LUNs), thus maintaining a view of the load on the controller. Other methods of selecting another path may additionally or alternatively be used.

Paths may be identified by multipathing software (not shown) in the host 120 that monitors the SAN 100 and maintains a list of identified paths to storage devices. The multipathing software identifies and manages paths and may direct that blocks are retrieved along certain paths (based on steps identified later in this specification) to achieve load balancing within the SAN. In embodiments of the invention, for example, the multipathing software may be modified to implement methods according to embodiments of the invention, or the multipathing software may be instructed or controlled to carry out methods according to embodiments of the invention.

Once a path has been selected in step 306, a path range for the selected path is determined in step 308. A path range is the serviceable range of the path, i.e. the blocks that can be communicated along that path.

To determine a serviceable range for a path, the following formula is used:

$$\text{serviceable range} = \text{last block serviced} \pm \text{block threshold}$$

where:
serviceable range=the range of block numbers that can be serviced by the path;
last block serviced=the last block number that was retrieved by the host 120 along that path; and
block threshold=a predetermined threshold number of blocks that can be serviced by a path, initialized in step 304.

Where a path has not serviced a block, then the last block serviced value is initialized with the block number of the first block that is to be sent-along the selected path, and the number of blocks serviced by the path is initialized to zero. Once the serviceable range is determined for the selected path in step 308, the method 300 ends at step 310.

If it is determined in step 302 that the paths have been initialized, i.e. the block serviceable range has been initialized, then the method 300 proceeds from step 302 to step 312. In step 312, a search is carried out to find a path with an appropriate range. A path with an appropriate range is a path that has a serviceable block range that contains the first block of the I/O to be performed within the SAN. An appropriate path is also a path that has a block threshold that has a number of blocks serviced that is less than the block threshold value.

The method proceeds to step 314 where it is determined if there is a path with an appropriate range and number of blocks serviced. If there is such a path, then the path is selected in step 316 and the method 300 ends at step 310. If there is no appropriate path available, then the method instead proceeds from step 314 to step 306 where an alternative path is selected as described above. The selected path (selected in either step 306 or step 316 of the method 300) is subsequently used to retrieve blocks in the I/O operation in step 204 of the method 200 of FIG. 2.

Thus, a path services a group of sequential blocks (such as those blocks in an I/O buffer) in an I/O operation within a SAN, and a path may or may not service another group of blocks in another I/O operation. If a path has serviced more than the allowed number of blocks (the block threshold) then that block is no longer selected for servicing blocks in an I/O operation, and another path is chosen for the next group of blocks. This ensures that at least some sequential blocks are retrieved in order from the storage device and thus the storage device identifies that sequential blocks are being retrieved. The storage device may then use its prefetch feature effectively by prefetching blocks further in the sequence (but not yet retrieved or requested) by loading these blocks into the cache of the storage device. There is a chance that subsequent blocks retrieved are those blocks that are further along in the sequence, and these can be supplied quickly as they are already in the cache.

Once a group of sequential data blocks has been retrieved from the storage device along a path in an I/O operation, the "last block serviced" attribute is updated for the block number of the last block to be retrieved along that path. The "number of blocks serviced" is also updated by adding the number of blocks in the group that were retrieved along that path. If the number of blocks serviced thus becomes greater than the block threshold, then no further blocks can be serviced by that path, and another path must be selected for subsequent retrieval of blocks (that is, blocks to be retrieved in other I/O operations).

If no paths are found that have an appropriate range and number of blocks serviced, then another path is chosen in step 306 of the method 300. In this way, blocks that are previously marked as being unavailable (i.e. have serviced more blocks than the block threshold or have inappropriate ranges) may be selected again and their serviceable block range and number of blocks serviced re-initialized.

A user (for example, system administrator) may set a value for the block threshold. Alternatively the user may specify a range for the block threshold value. Where a range is specified, embodiments of the invention may monitor the average turnaround time or average service time (retrieval time) per block for each of the range of values over a predetermined period of time, and then select the block threshold value which gives the lowest average turnaround time or average service time per block. This may even be done without a user specifying a range by, for example, automatically selecting a suitable range, or by selecting a suitable starting point and increasing or decreasing the block threshold value to minimize the average service time. Any method may be used to select any appropriate block threshold value. The block threshold may remain fixed once it is set or it may vary dynamically (for example, this may comprise monitoring the average service time for multiple values for the block threshold and periodically choosing the block threshold value corresponding to the lowest average service time). Additionally or alternatively, the block threshold value may be changed by a user as required, or the user may specify a new range of suitable values.

In the above description, data blocks are manipulated and retrieved. However, a data block may comprise a single data block from the point of view of the storage device and/or the host. However, alternatively the data block may comprise, for example, multiple data blocks, a portion of a data block or portions of multiple data blocks.

Figure 4:
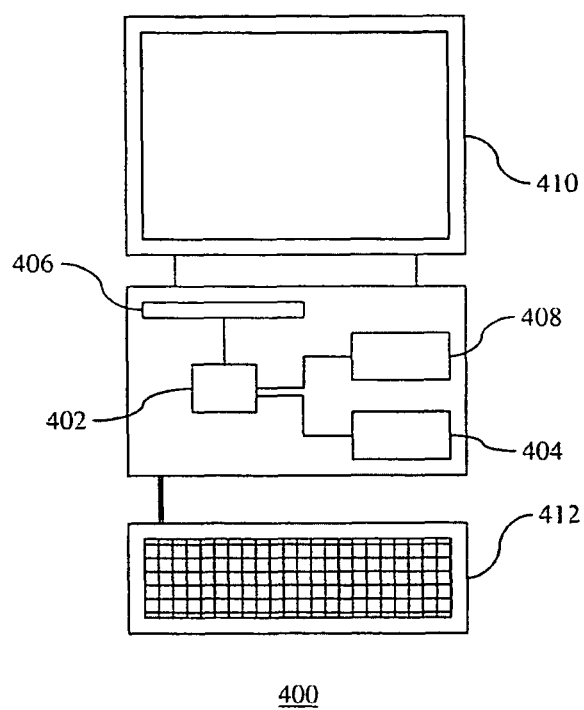
FIG. 4 shows an example of a data processing system suitable for use with embodiments of the invention.

FIG. 4 shows an example of a data processing system 400 that may be suitable to be a host communicating with a storage area network (SAN). The system 400 comprises a data processor 402, communication device 404 and memory 406 (such as RAM). The communication device 404 enables the system 400 to communicate with the SAN. For example, the communication device 404 may comprise a host bus adapter (HBA) or network interface card (NIC).

The data processing system may also comprise one or more of a permanent storage device 408 (such as a hard disk), a display device 410 and a human interface device 412 (such as a mouse and/or keyboard).

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of retrieving data blocks in a storage area network, the method comprising:

in response to an input/output (I/O) operation to be performed with respect to a storage device, determining whether any of a plurality of paths to the storage device is available for the I/O operation, wherein the determining is based on determining which of the plurality of paths has a corresponding range of block identifiers that corresponds to a block requested by the I/O operation;

in response to determining that a particular one of the plurality of paths is available for the I/O operation, selecting the particular path to the storage device, wherein determining that the particular path is available comprises determining that a number of blocks serviced by the particular path has not exceeded a predefined threshold;

retrieving a first number of sequential data blocks from the storage device along the particular path; and after the retrieving, selecting a second one of the plurality of paths for retrieving subsequent sequential data blocks from the storage device;

in response to determining that none of the plurality of paths is available for the I/O operation, selecting another of the plurality of paths based on comparing turnaround times of respective ones of at least some of the plurality of paths;

monitoring turnaround times for blocks communicated over the plurality of paths; and varying the predefined threshold based on the monitored turnaround times.

2. A method as claimed in claim 1, further comprising assigning a respective range of block identifiers to each of the plurality of paths.

3. A method as claimed in claim 1, wherein comparing the turnaround times of respective ones of the at least some of the plurality of paths comprises comparing average turnaround times, and wherein selecting the another path comprises selecting the path with the lowest average turnaround time.

4. A method as claimed in claim 1, further comprising, after retrieving a second number of sequential data blocks from the storage device along the second path, selecting a third one of the plurality of paths for retrieving further subsequent sequential data blocks from the storage device.

5. A system for retrieving data blocks in a storage area network, the system comprising:

a communication device to communicate over the storage area network with a storage device; and at least one processor configured to:

in response to an input/output (I/O) operation to be performed with respect to the storage device, determine whether any of a plurality of paths to the storage device is available for the I/O operation, wherein the determining is based on determining which of the plurality of paths has a corresponding range of block identifiers that corresponds to a block requested by the I/O operation;

in response to determining that a particular one of the plurality of paths is available for the I/O operation, select the particular path to the storage device, wherein determining that the particular path is available comprises determining that a number of blocks serviced by the particular path has not exceeded a predefined threshold;

retrieve a first number of sequential data blocks from the storage device along the particular path; and after the retrieving, select a second one of the plurality of paths for retrieving subsequent sequential data blocks from the storage device;

in response to determining that none of the plurality of paths is available for the I/O operation, select another of the plurality of paths based on comparing turnaround times of respective ones of at least some of the plurality of paths;

monitor turnaround times for blocks communicated over the plurality of paths; and vary the predefined threshold based on the monitored turnaround times.

6. A system as claimed in claim 5, wherein the comparing of the turnaround times of respective ones of the at least some of the plurality of paths comprises comparing average turnaround times, and wherein the selecting of the another path comprises selecting the path with the lowest average turnaround time.

7. A system as claimed in claim 5, wherein the at least one processor is configured to, after retrieving a second number of sequential data blocks from the storage device along the second path, select a third one of the plurality of paths for retrieving further subsequent sequential data blocks from the storage device.

8. A non-transitory computer readable storage storing a computer program that upon execution by at least one processor causes the at least one processor to:

in response to an input/output (I/O) operation to be performed with respect to a storage device, determine whether any of a plurality of paths to the storage device is available for the I/O operation, wherein the determining is based on determining which of the plurality of paths has a corresponding range of block identifiers that corresponds to a block requested by the I/O operation;

in response to determining that a particular one of the plurality of paths is available for the I/O operation, select the particular path to the storage device, wherein determining that the particular path is available comprises determining that a number of blocks serviced by the particular path has not exceeded a predefined threshold;

retrieve a first number of sequential data blocks from the storage device along the particular path; and after the retrieving, select a second one of the plurality of paths for retrieving subsequent sequential data blocks from the storage device;

in response to determining that none of the plurality of paths is available for the I/O operation, select another of the plurality of paths based on comparing turnaround times of respective ones of at least some of the plurality of paths;

monitor turnaround times for blocks communicated over the plurality of paths; and vary the predefined threshold based on the monitored turnaround times.

9. A method as claimed in claim 1, further comprising re-initializing a range of block numbers assigned to the selected another path.

10. A system as claimed in claim 5, wherein the at least one processor is configured to further re-initialize a range of block numbers assigned to the selected another path.

11. A computer readable storage as claimed in claim 8, wherein the computer program upon execution causes the at least one processor to further re-initialize a range of block numbers assigned to the selected another path.

\* \* \* \* \*